(12) United States Patent
Kim et al.

(10) Patent No.: US 7,845,539 B1
(45) Date of Patent: Dec. 7, 2010

(54) BUMP PRINTING APPARATUS

(75) Inventors: Joon Kon Kim, Gyunggi-do (KR); Sang Soon Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/588,215

(22) Filed: Oct. 7, 2009

(30) Foreign Application Priority Data

May 13, 2009 (KR) ...................... 10-2009-0041646

(51) Int. Cl.
*B23K 37/00* (2006.01)
*B23K 31/02* (2006.01)

(52) U.S. Cl. .......................... 228/39; 228/41; 228/44.7; 228/49.5

(58) Field of Classification Search ....................... None
See application file for complete search history.

(56) References Cited

U.S. PATENT DOCUMENTS

| | | | | |
|---|---|---|---|---|
| 4,924,258 A | * | 5/1990 | Tsutsui | 355/53 |
| 5,429,045 A | * | 7/1995 | Karlyn et al. | 101/35 |
| 5,513,788 A | * | 5/1996 | Cochrane et al. | 224/42.23 |
| 5,582,104 A | * | 12/1996 | Best et al. | 101/126 |
| 5,775,395 A | * | 7/1998 | Wilkins | 144/286.5 |
| 5,927,193 A | * | 7/1999 | Balz et al. | 101/129 |
| 6,186,063 B1 | * | 2/2001 | Di Prisco et al. | 101/123 |
| 6,247,640 B1 | * | 6/2001 | Kuwazaki et al. | 228/245 |
| 2004/0020435 A1 | * | 2/2004 | Tsuchiya et al. | 118/723 VE |
| 2005/0196531 A1 | * | 9/2005 | Chikahisa et al. | 427/207.1 |
| 2005/0252395 A1 | * | 11/2005 | Sakaue et al. | 101/123 |
| 2009/0145313 A1 | * | 6/2009 | Gochenauer et al. | 101/129 |
| 2009/0193986 A1 | * | 8/2009 | Kusunoki et al. | 101/114 |

FOREIGN PATENT DOCUMENTS

JP 4-146440 A * 5/1992
KR 10-2008-0055715 6/2008

* cited by examiner

*Primary Examiner*—Kiley Stoner

(57) ABSTRACT

There is provided a bump printing apparatus that can improve the printability of solder bumps printed on a board. The bump printing apparatus may include a printing table onto which a board is mounted; a mask making close contact with the board and printing solder bumps on the board by separating the mask from the board after a printing operation; and mask tables extending from the printing table to edges of the mask and sucking the edges of the mask to bring the edges of the mask into close contact with the board under vacuum.

9 Claims, 10 Drawing Sheets y-y

BUMP PRINTING APPARATUS

CROSS-REFERENCE TO RELATED APPLICATIONS

This application claims the priority of Korean Patent Application No. 10-2009-0041646 filed on May 13, 2009, in the Korean Intellectual Property Office, the disclosure of which is incorporated herein by reference.

BACKGROUND OF THE INVENTION

1. Field of the Invention

The present invention relates to a bump printing apparatus, and more particularly, to a bump printing apparatus that can increase the printability of solder bumps being printed on a printed circuit board.

2. Description of the Related Art

In general, flip chip bonding, tape automated bonding and wire bonding are being used to interconnect external boards, such as printed circuit boards (PCBs) or wafer level packages (WLPs), to chips.

Among them, flip chip bonding has been widely used to manufacture portable electronic products since this method increases the number of pads per unit area.

According to flip chip bonding, solder bumps are formed on a wafer in order to appropriately bond chips and external circuitry. Particularly, a technique for manufacturing solder bumps has been developed to form solder bumps having appropriate conductivity, uniform lengths and fine pitches.

According to this solder bump forming technique for flip chip bonding, the characteristics of solder bumps and an application range thereof are determined according to the materials used to form solder bumps. Examples of the solder bump forming technique may include a soldering method of contacting pad electrodes to solder, a screen printing method of forming solder bumps on pad electrodes by screen printing and reflowing the solder bumps, a solder ball reflow method of mounting solder balls onto pad electrodes and reflowing the mounted solder balls, and a plating method of performing solder plating on pad electrodes.

Among them, a screen printing method has been widely used to form solder bumps in that the process of forming solder bumps in this manner is simple, manufacturing costs are low, and bumps of desired metallic material can be formed.

Solder bumps are printed according to this screen printing method by which, while a (metal) mask having holes arranged into a predetermined pattern makes close contact with a printed circuit board, a solder paste is compressed and moved across the upper surface of the mask to thereby fill the holes.

However, according to the current screen printing method, since the mask is merely placed onto and makes close contact with the upper surface of the printed circuit board, gaps may be generated between the board and the mask.

These gaps mostly occur around the edges of the board in surface contact with the mask, where printing defects, such as the spreading of the solder paste, short circuits and missing bumps, in which bumps are not formed, occur in large quantities.

As a result, the printability of the solder bumps is reduced to thereby cause a deterioration in product quality and a reduction in the reliability of a circuit board.

SUMMARY OF THE INVENTION

An aspect of the present invention provides a bump printing apparatus that can improve the printability of solder bumps by preventing printing defects and increase the reliability of a board by preventing defects in solder bumps.

According to an aspect of the present invention, there is provided a bump printing apparatus including: a printing table onto which a board is mounted; a mask making close contact with the board and printing solder bumps on the board; and mask tables extending from the printing table to edges of the mask and sucking the edges of the mask to bring the edges of the mask into close contact with the board under vacuum.

The bump printing apparatus may further include air nozzles provided within the printing table and the mask tables, providing air suction so that the board and the mask make close contact with the printing table and the mask tables, respectively, and spraying air so that the mask is separated from the board.

The mask tables may extend towards outer surfaces of the printing table and be formed integrally with the printing table.

The mask tables may be detachably provided on the outer surfaces of the printing table.

An upper surface of the mask table may be located on the same horizontal plane as an upper surface of the board.

The mask tables may face each other on the basis of the printing table and protrude to a height corresponding to a thickness of the board so that a step is formed between the printing table and each of the mask tables.

The air nozzles may include: a plurality of board nozzles arranged along the upper surface of the printing table and providing air suction to bring the board into close contact with the printing table; and a plurality of mask nozzles arranged along upper surfaces of the mask tables, providing air suction to bring the mask into close contact with the board and the mask tables, and spraying air to separate the mask from the board.

The plurality of mask nozzles may be arranged along the upper surfaces of the mask tables and the printing table.

The board may have air holes formed therethrough so that air being sprayed through the air nozzles passes through the board and moves upward from the board.

The bump printing apparatus may further include a control unit controlling the air nozzles.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1A:
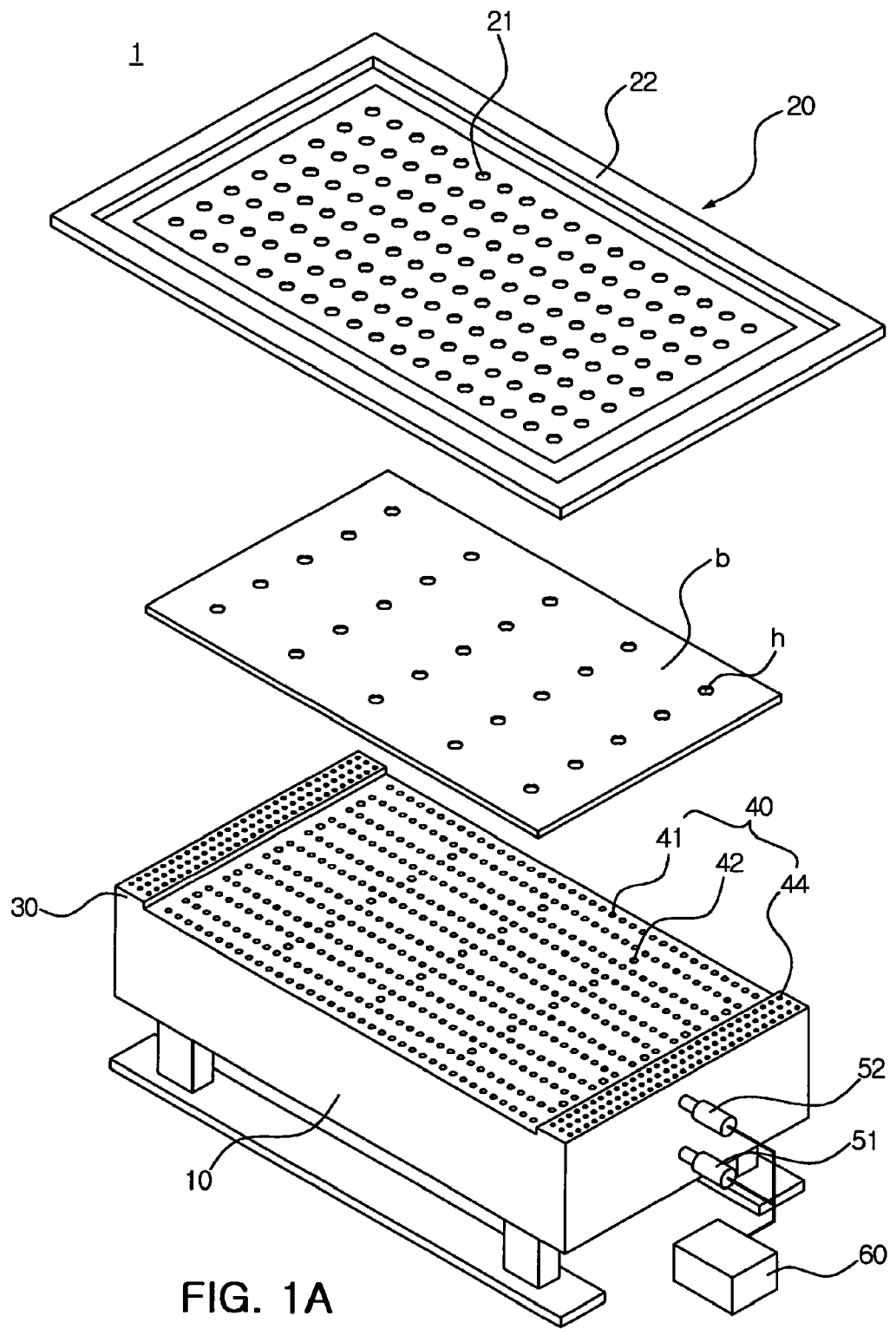
FIG. 1A is a perspective view schematically illustrating a bump printing apparatus according to an exemplary embodiment of the present invention.
Figure 1B:
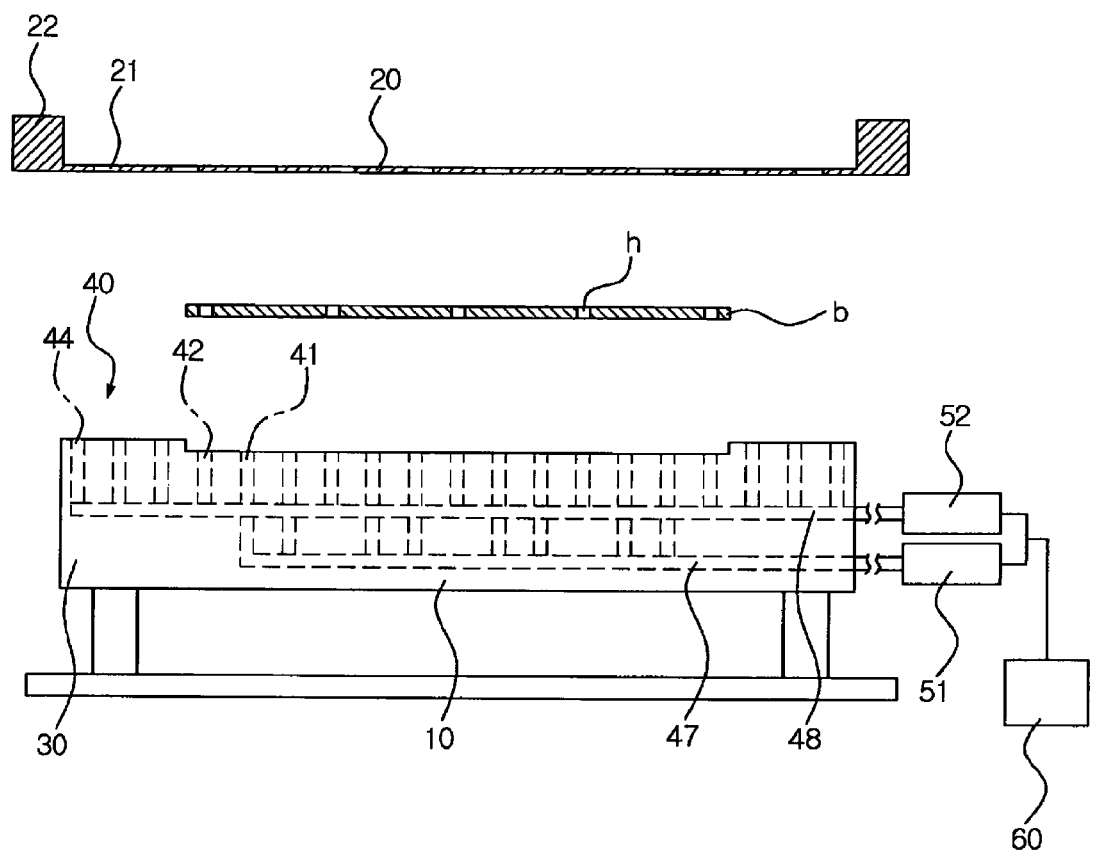
FIG. 1B is a cross-sectional view schematically illustrating the bump printing apparatus shown in FIG. 1A.
Figure 2A:
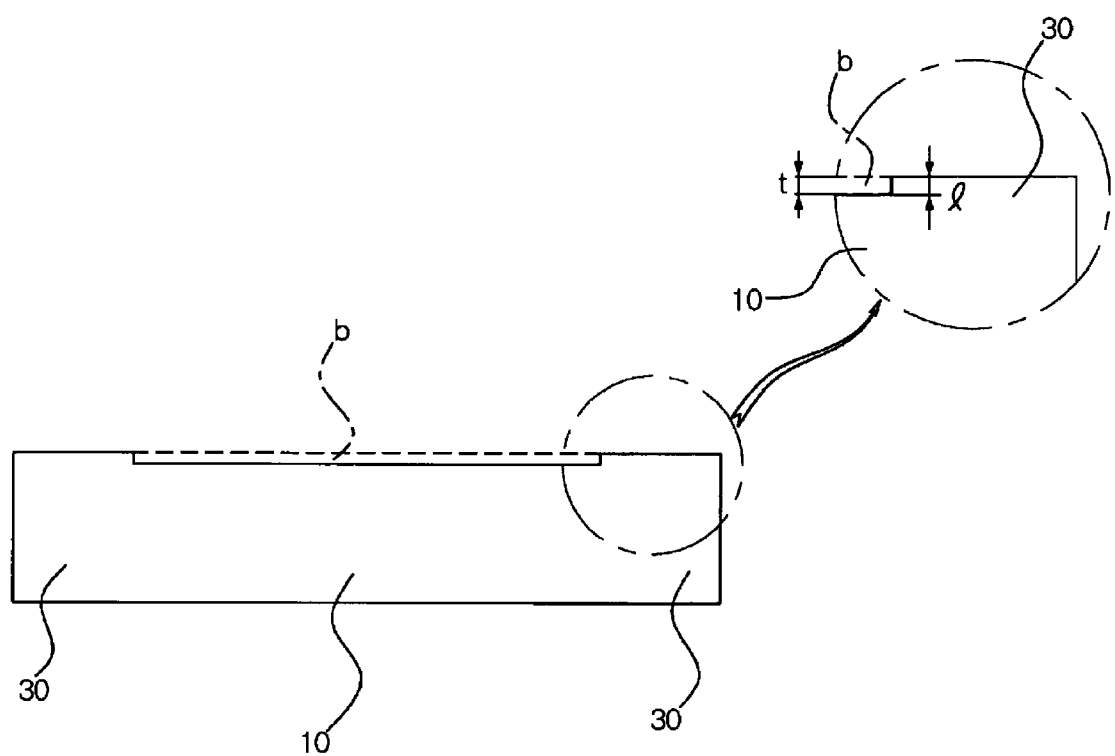
FIG. 2A is a cross-sectional view schematically illustrating an example of mask tables and a printing table of the bump printing apparatus, shown in FIGS. 1A and 1B.
Figure 2B:
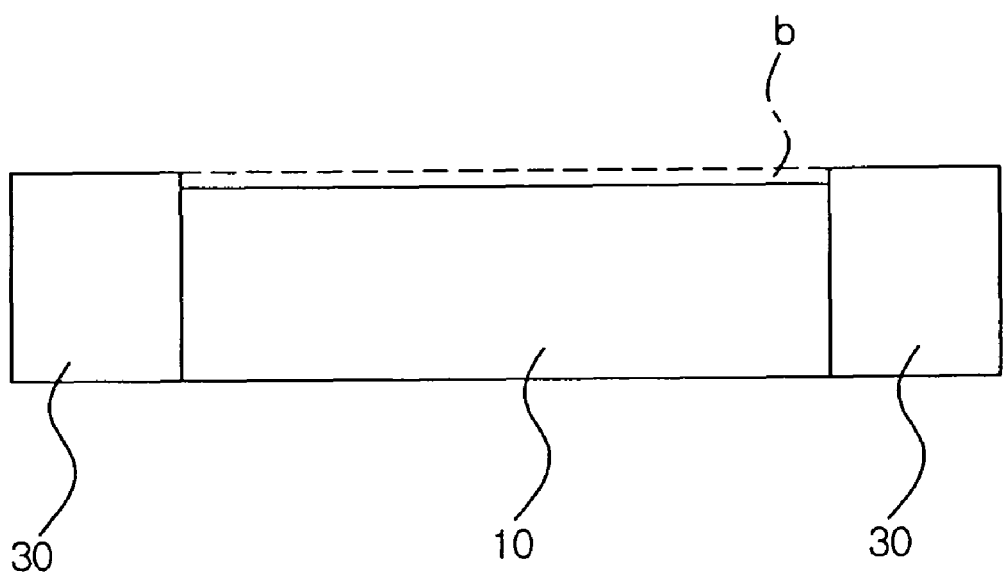
FIG. 2B is a cross-sectional view schematically illustrating another example of mask tables and a printing table of the bump printing apparatus, shown in FIGS. 1A and 1B.
Figure 3A:
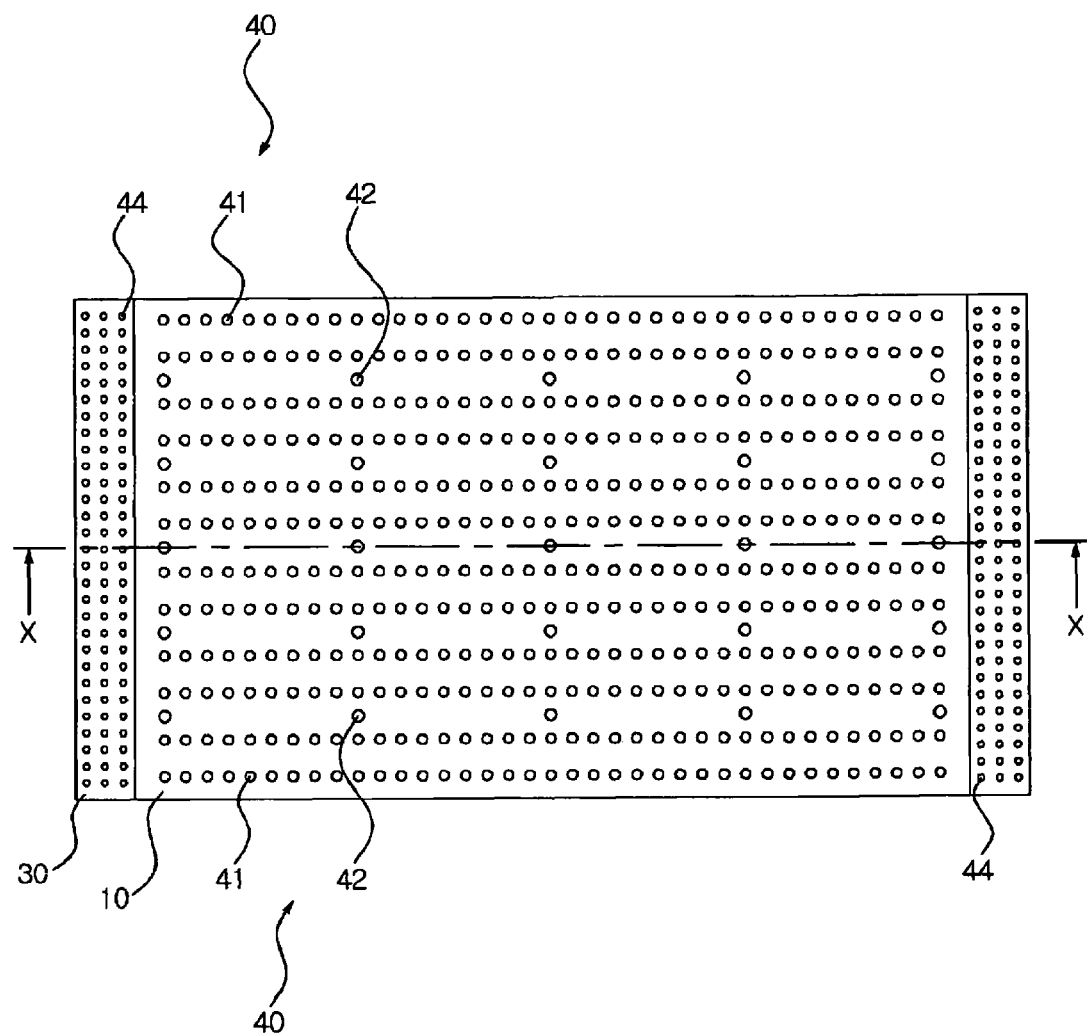
FIG. 3A is a plan view schematically illustrating an example of mask tables from the mask tables and the printing table, shown in FIGS. 1A and 1B.
Figure 3B:
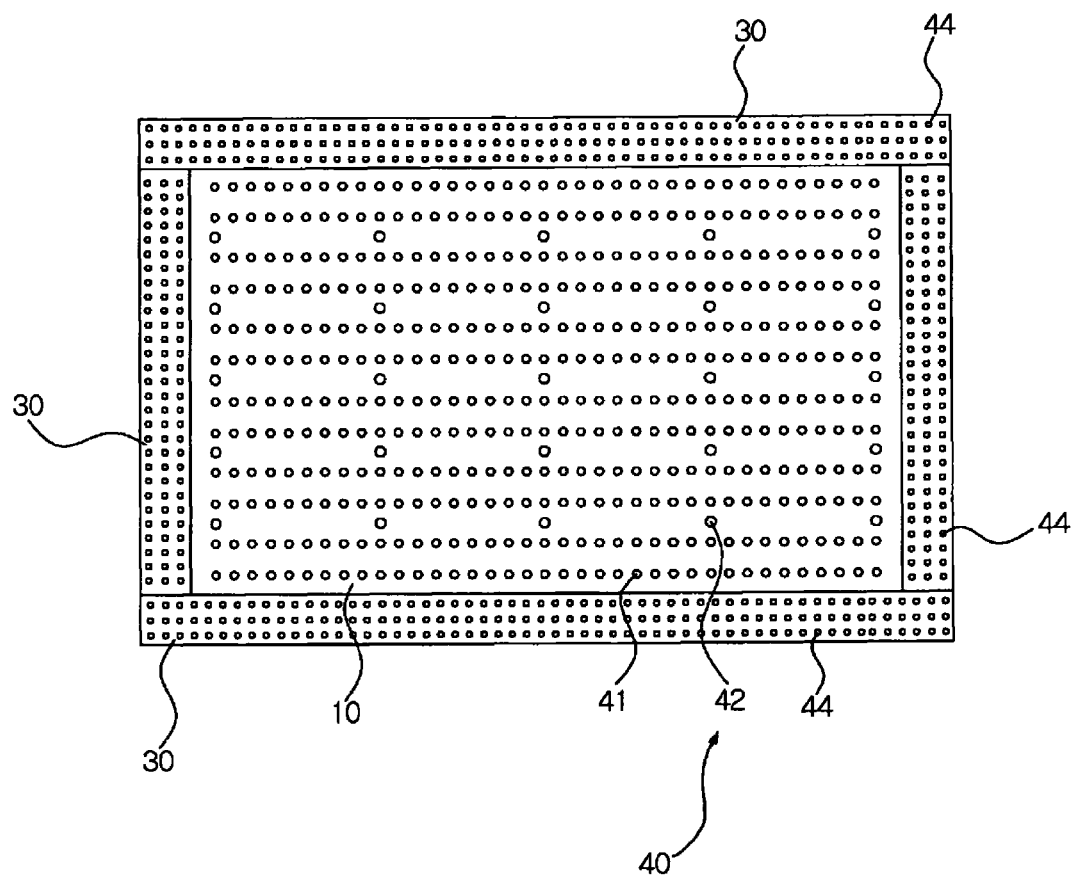
FIG. 3B is a plan view schematically illustrating another example of mask tables from the mask tables and the printing table, shown in FIGS. 1A and 1B.
Figure 4A:
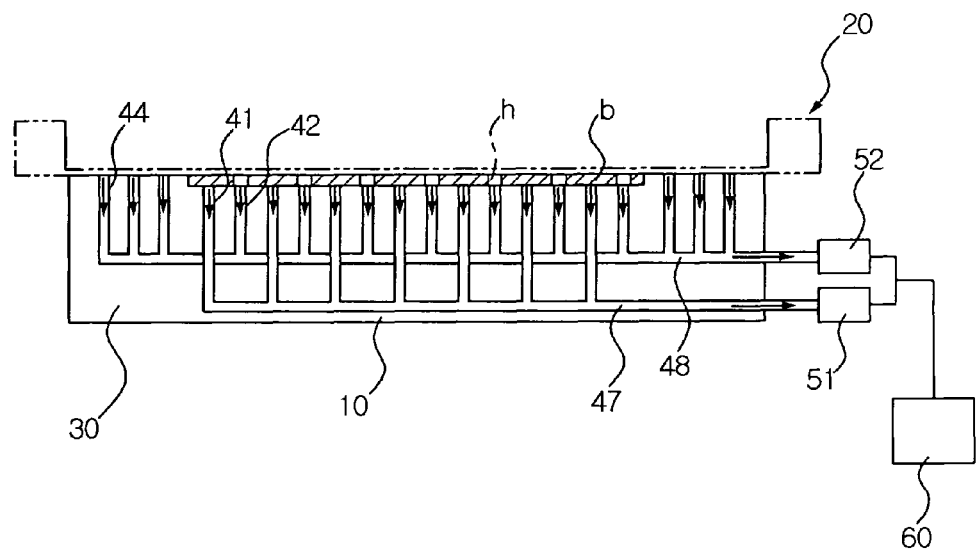
FIG. 4A is a cross-sectional view schematically illustrating an example of board nozzles and mask nozzles of the mask tables and the printing table, shown in FIGS. 1A and 1B.
Figure 4B:
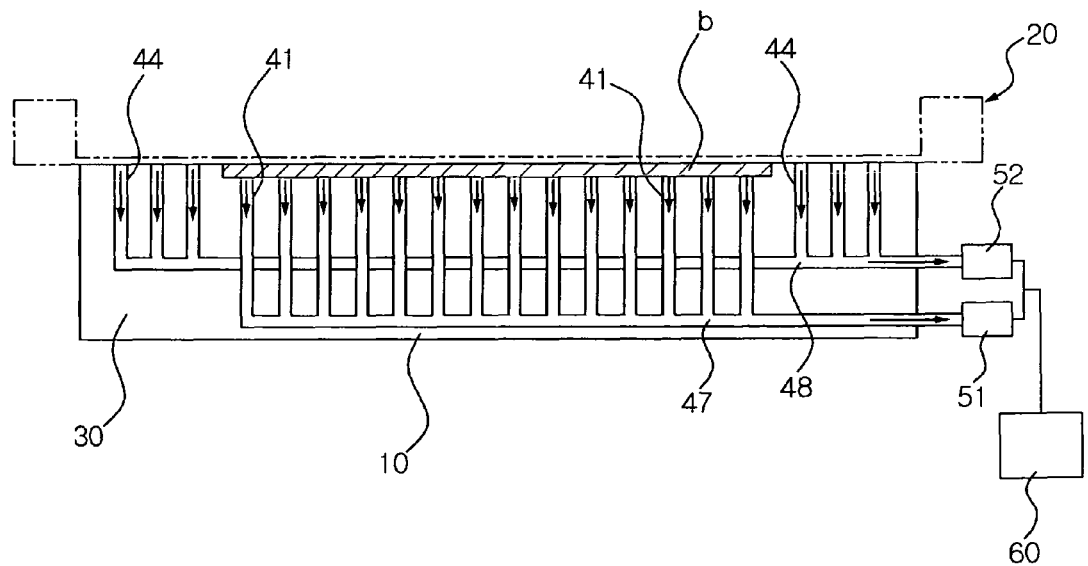
FIG. 4B is a cross-sectional view schematically illustrating another example of board nozzles and mask nozzles of the mask tables and the printing table, shown in FIGS. 1A and 1B.

FIG. 1A is a perspective view schematically illustrating a bump printing apparatus according to an exemplary embodiment of the present invention. FIG. 1B is a cross-sectional view schematically illustrating the bump printing apparatus shown in FIG. 1A. FIG. 2A is a cross-sectional view schematically illustrating an example of mask tables and a printing table of the bump printing apparatus, shown in FIGS. 1A and 1B. FIG. 2B is a cross-sectional view schematically illustrating another example of mask tables and a printing table of the bump printing apparatus, shown in FIGS. 1A and 1B. FIG. 3A is a plan view schematically illustrating an example of mask tables from the mask tables and the printing table, shown in FIGS. 1A and 1B. FIG. 3B is a plan view schematically illustrating another example of mask tables from the mask tables and the printing table, shown in FIGS. 1A and 1B. FIG. 4A is a cross-sectional view schematically illustrating an example of board nozzles and mask nozzles of the mask tables and the printing table, shown in FIGS. 1A and 1B. FIG. 4B is a cross-sectional view schematically illustrating another example of board nozzles and mask nozzles of the mask tables and the printing table, shown in FIGS. 1A and 1B.

Figure 5A:
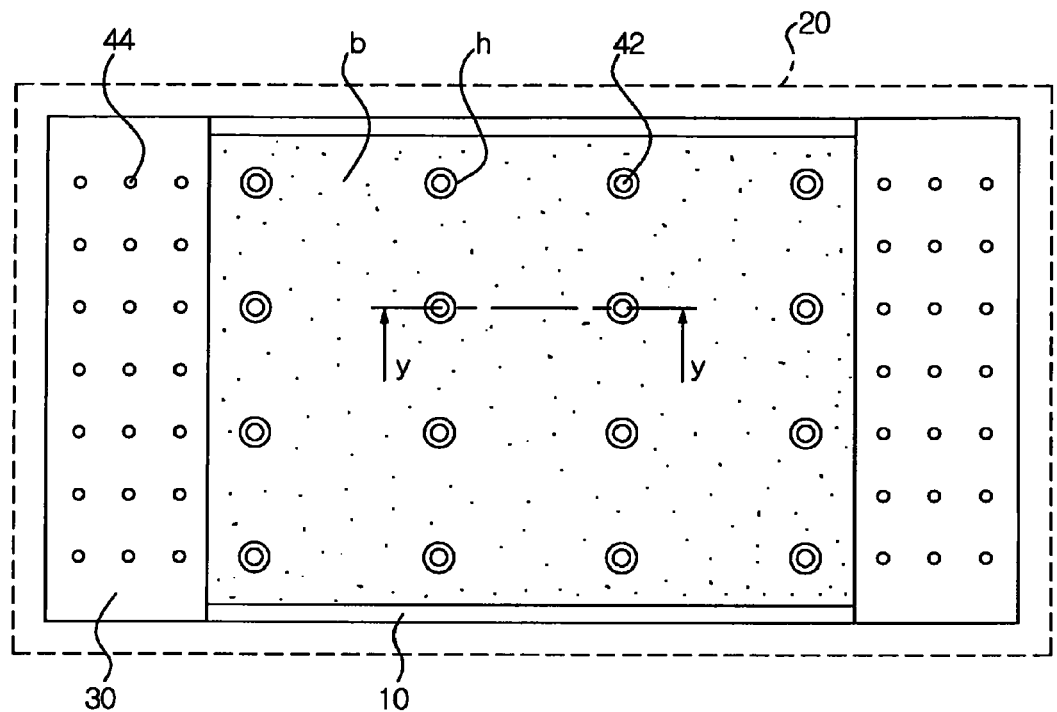
FIG. 5A is a plan view illustrating a state in which a board is placed onto the mask tables and the printing table, shown in FIG. 3A.
Figure 5B:
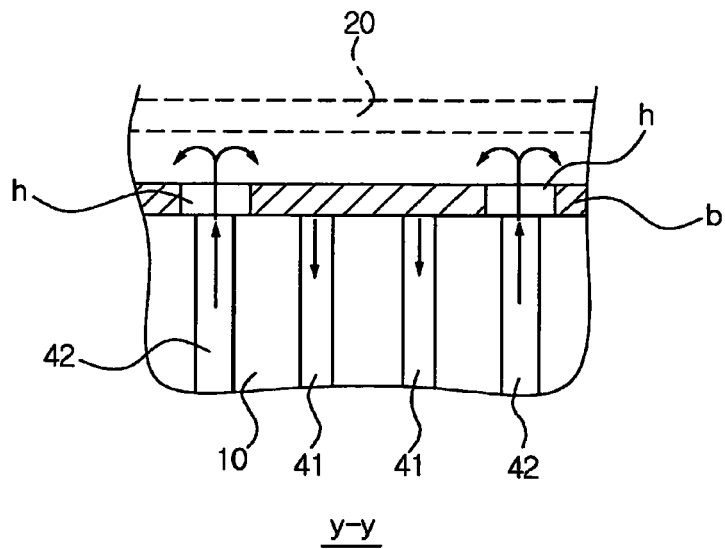
FIG. 5B is an enlarged cross-sectional view taken along the line y-y of FIG. 5A.
Figure 6:
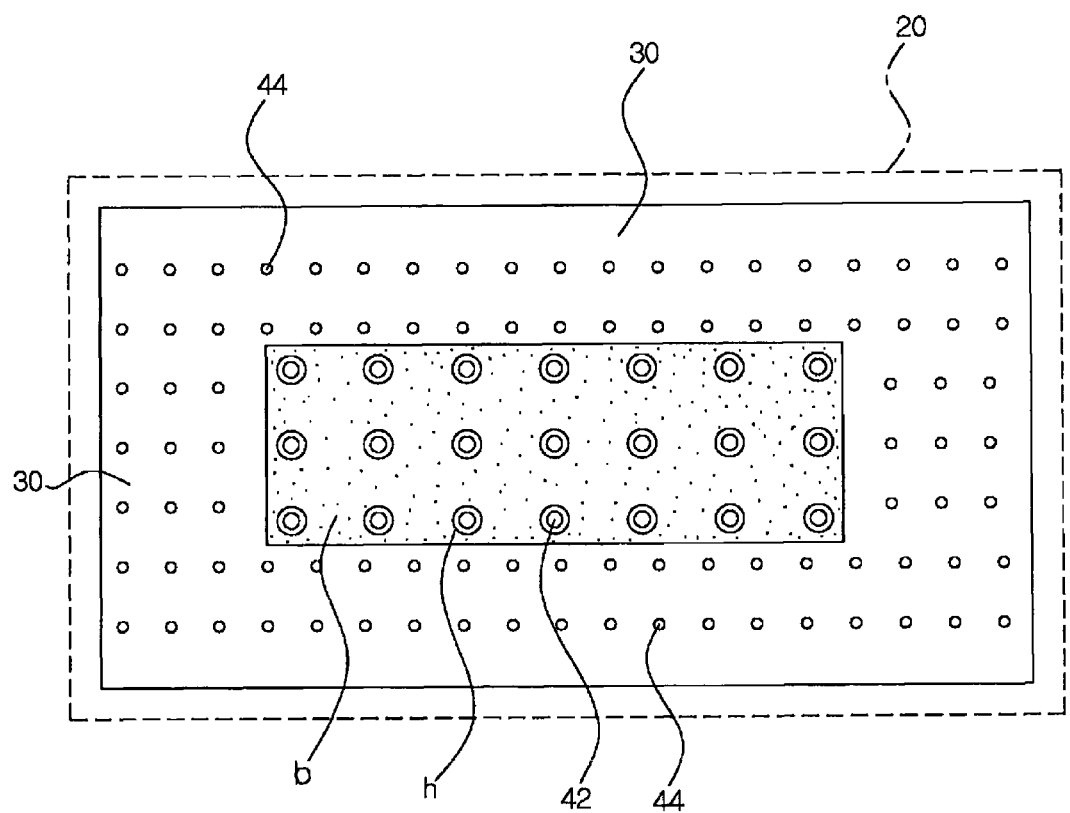
FIG. 6 is a plan view illustrating a state in which a board is placed onto the mask tables and the printing table, shown in FIG. 3B.

FIG. 5A is a plan view illustrating a state in which a board is placed onto the mask tables and the printing table, shown in FIG. 3A. FIG. 5B is an enlarged cross-sectional view taken along the line y-y of FIG. 5A. FIG. 6 is a plan view illustrating a state in which a board is placed onto the mask tables and the printing table, shown in FIG. 3B.

Referring to FIGS. 1 through 6, a bump printing apparatus 1 according to this embodiment includes a printing table 10, a mask 20, mask tables 30 and air nozzles 40.

The printing table 10 is a jig member that is used to secure a board b to be mounted onto an upper surface thereof so as to perform screen printing to print solder bumps 70.

As shown in FIGS. 1A and 1B through 6A and 6B, the printing table 10 generally has a rectangular shape corresponding to a shape of the board b. However, the present invention is not limited thereto.

As for the board b, general boards, such as a ceramic board and a printed circuit board (PCB), formed of resin materials, including rigid and flexible PCBs, may be used.

Here, a plurality of air holes h are formed through the board b so that air being sprayed through the air nozzles 40 passes through the board b and moves upward from the board b.

The air holes h are formed so that air being sprayed from the printing table 10 separates the mask 20 in close contact with the board b without being interrupted by the board b. A detailed description of the air holes h will be described in detail below.

The mask 20 is provided on an upper surface of the board b that is mounted on the printing table 10. The mask 20 has pattern holes 21, arranged in a predetermined pattern, and is supported by a jig 22.

The mask 20 makes close contact with and is secured to the upper surface of the board b. After a solder paste p is compressed and moved using a squeegee s in order to print the solder bumps 70, the mask 20 is separated from the board b again to thereby form the solder bumps 70 on the board b.

At this time, as a vacuum is substantially created between the mask 20 and the board b, the mask 20 and board b are not misaligned during a screen printing process to thereby accurately print the solder bumps 70 at design positions.

The mask 20 may be a general metal mask. However, the present invention is not limited thereto. A mask of another material may be provided as the mask 20.

The mask tables 30 extend from the printing table 10 to the edges of the mask 20 and suck the edges of the mask 20 to bring the edges of the mask 20 into close contact with the board b under vacuum.

That is, the mask 20 for screen printing has a larger size than the printing table 10. When the mask 20 makes close contact with the printing table 10 onto which the board b is mounted, the edges of the mask 20 are placed outside the printing table 10.

In this case, since the mask 20 cannot maintain a horizontal state, gaps occur between the mask 20 and the board b.

Therefore, the edges of the mask 20 are supported using the mask tables 30 so that the mask 20 makes close contact with the board b while maintaining the horizontal state to prevent the generation of gaps between the board b and the mask 20.

In particular, the mask tables 30 include a plurality of mask nozzles 42 and 44 and suck the edges of the mask 20 to bring the edges of the mask 20 into close contact with the board b under vacuum. This Will be described in detail below.

As shown in FIG. 2A, the mask tables 30 may extend toward the outside of the printing table 10 by die-casting or cutting and be formed integrally with the printing table 10.

Alternatively, as shown in FIG. 2B, the mask tables 30 may be detachably mounted on the outside of the printing table 10.

Here, as the mask tables 30, provided separate from the printing table 10, are attached to and detached from the outside of the printing table 10, the mask tables 30 can be replaced according to the size and thickness of the mask 20 or the board b.

Furthermore, repairs and maintenance thereof are facilitated.

The mask tables 30 face each other on the basis of the printing table 10. The mask tables 30 each protrude to a height h corresponding to a thickness t of the board b so that a step is formed between each of the mask tables 30 and the printing table 10.

That is, as shown in FIG. 3A, one pair of mask tables 30 are arranged on both left and right surfaces of the printing table 10 and face each other.

As shown in FIG. 3B, two pairs of mask tables 30 are arranged along four edges of the printing table 10 to thereby surround the printing table 10. Here, the height h of the step corresponding to a difference in height between the mask table 30 and the printing table 10 is substantially the same as the thickness t of the board b.

Therefore, an upper surface of the mask table 30 is located on the same horizontal plane as the upper surface of the board b that is mounted onto the printing table 10.

Therefore, the mask 20, placed on the board b and the mask table 30, may maintain the horizontal state without sag and make close contact with the board b.

Meanwhile, the air nozzles 40 are provided within the printing table 10 and the mask table 30, provide air suction such that the board b and the mask 20 make close contact with the printing table 10 and the mask table 30, respectively, and spray air to separate the mask 20 from the board b.

As shown in FIG. 4A, the air nozzles 40 include board nozzles 41 and the mask nozzles 42 and 44. The board nozzles 41 provide air suction so that the board b makes close contact with the printing table 10. The mask nozzles 42 and 44 provide air suction so that the mask 20 makes close contact with the board b and the mask tables 30, and spray air so that mask 20 is separated from the board b.

The plurality of board nozzles 41 are arranged along the upper surface of the printing table 10 and provide air suction at constant pressure to thereby secure the board b to be mounted on the upper surface of the printing table 10 by vacuum suction.

The plurality of mask nozzles 42 and 44 are arranged along the upper surfaces of the printing table 10 and the mask tables 30, respectively, and provide air suction at constant pressure to secure the mask 20 to the upper surfaces of the board b and the mask tables 30.

Therefore, the mask 20, which maintains the horizontal state with the use of the mask tables 30, makes close contact with the board b by air suction of the mask nozzles 42 and 44, thereby preventing the generation of gaps between the mask 20 and the board b.

Further, the mask nozzles 42 and 44 spray air between the mask 20 and the board b and generate air pressure between the mask 20 and the board b in close contact under vacuum to thereby separate the mask 20 and the board b from each other.

In particular, the mask nozzles 42 and 44 spray air while adjusting the pressure of air being sprayed so that the mask 20 can be separated from the board b while maintaining the horizontal state.

That is, while printing the solder bumps 70, like the board nozzles 41, the mask nozzles 42 and 44 provide air suction so that the mask 20 makes close contact with the upper surface of the board b. To separate the board b and the mask 20 from each other when finishing the printing process, the mask 20 is not forcibly separated like the related art, although the mask 20 sags, but the mask 20 is separated from the board b while maintaining the horizontal state by air pressure caused by air blowing, so that the solder paste p can be easily withdrawn from the pattern holes to thereby form the solder bumps 70.

As shown in FIG. 4B, the plurality of mask nozzles 44 may be arranged along the upper surfaces of the mask tables 30 alone. In this case, the mask nozzles have a simplified configuration, thereby facilitating the manufacture of the mask tables 30 and the printing table 10

The board nozzles 41 and the mask nozzles 42 and 44 are connected to pipes 47 and 48, respectively, which do not communicate with each other and separately guide the flow of air. The pipes 47 and 48 are connected to air pumps 51 and 52, respectively, which are provided outside the printing table 10.

The air pumps 51 and 52 are controlled independently of each other so that air suction through the board nozzles 41 and air suction and spraying through the mask nozzles 42 and 44 are performed independently of each other.

The air nozzles 40, which are controlled according to the driving operation of the air pumps 51 and 52, can be more accurately controlled by a control unit 60 that is separately provided.

A solder bump printing process using a bump printing apparatus according to an exemplary embodiment of the present invention will now be described in detail with reference to FIG. 7.

FIGS. 7A through 7D are schematic views illustrating a sold bump printing process using a bump printing apparatus according to an exemplary embodiment of the present invention.

Figure 7A:
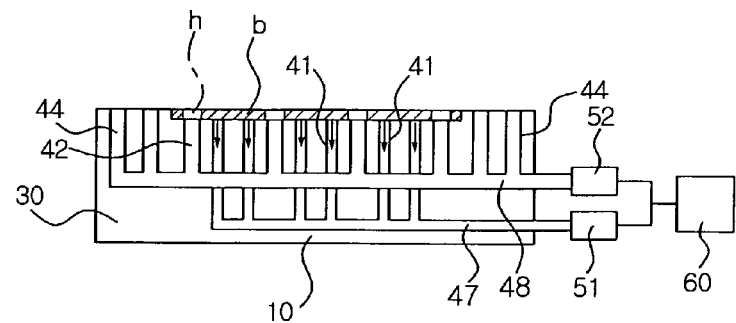
FIGS. 7A through 7D are schematic views illustrating a solder bump printing process using a bump printing apparatus according to an exemplary embodiment of the present invention.

As shown in FIG. 7A, the board b for printing the solder bumps 70 is placed on the upper surface of the printing table 10 having the printing board nozzles 41 and the mask nozzles 42 and 44 therein.

The plurality of air holes h are formed through the board b. Therefore, when the board b is placed on the printing table 10, the board b is arranged so that the air holes h and the mask nozzles 42 overlap and communicate with each other.

The air pump 51, connected to the board nozzles 41, is then operated to provide air suction through the board nozzles 41 so that the board b is secured to the printing table 10 by vacuum suction.

Figure 7B:
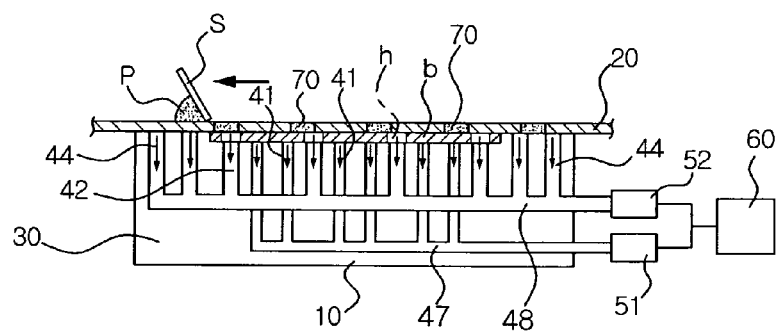

Then, as shown in FIG. 7B, the mask 20, which has the pattern holes 21 arranged in the predetermined pattern and is supported by the jig 22, is brought into close contact with the board b.

Here, the air pump 52, connected to the mask nozzles 42 and 44, is operated to provide air suction so that the mask 20 in close contact with the board b is subject to vacuum suction while maintaining the horizontal state.

As such, by compressing and moving the solder paste p across the upper surface of the mask 20 using the squeegee s while the board b and the mask 20 are in surface contact with each other, the solder paste p fills in the pattern holes 21 of the mask 20 to perform a printing process.

Figure 7C:
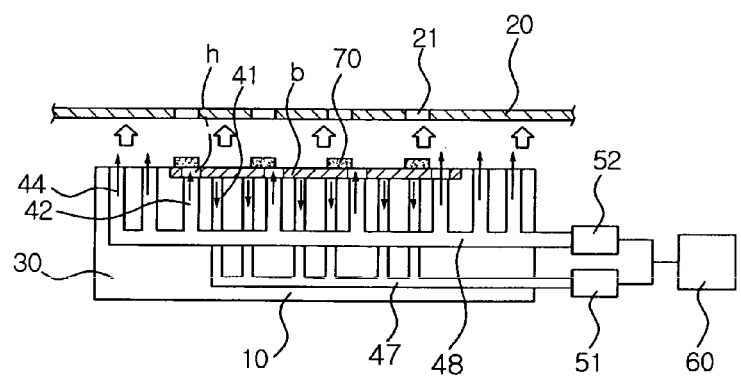

After the printing process is completed, as shown in FIG. 7C, the air pump 52, connected to the mask nozzles 42 and 44, is reversely operated to spray air through the mask nozzles 42 and 44 so that the mask 20 and the board b are separated from each other.

Here, since the mask nozzles 42 communicate with the air holes h of the board b, air, sprayed through the mask nozzles 42, may pass through the air holes h and move towards the upper surface of the board b.

Therefore, air pressure causing separation of the mask 20 and the board b from each other is generated by air being introduced between the board b and the mask 20.

Here, the board nozzles 41 continuously provide air suction to keep the board b secured to the printing table 10.

Figure 7D:
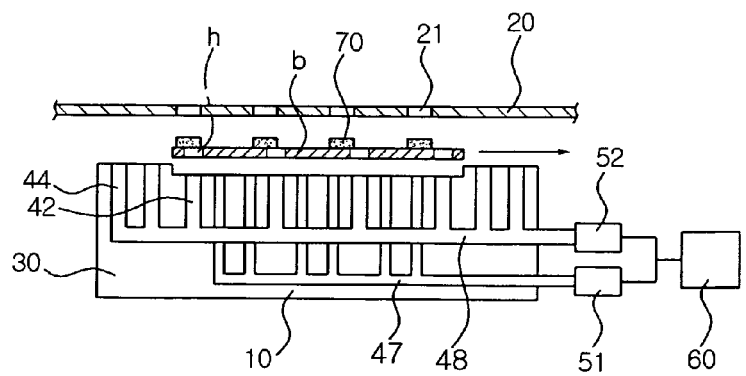

Then, as shown in FIG. 7D, after the mask 20 is separated from the board b, the spraying of air through the mask nozzles 42 and 44 is terminated, and air suction through the board nozzles 41 is terminated, so that the board b is removed from the printing table 10.

A new board b is arranged on the printing table 10, and a printing process continues to be performed on the board b.

The air pumps 51 and 52, connected to the board nozzles 41 and the mask nozzles 42 and 44, respectively, may be controlled independently of each other by the control unit 60. In particular, the control unit 60 controls the pressure of air sprayed through the mask nozzles 42 and 44 so as to maintain the horizontal state of the mask 20.

Therefore, elaborate management to separate the sagging mask 20 from the board in the related art is unnecessary.

As such, while the mask 20 can maintain the horizontal state with the use of the mask tables 30, the mask 20 makes close contact with the board b by air pressure caused by air suction of the mask nozzles 42 and 44, thereby effectively preventing the generation of gaps between the mask 20 and the board b.

Furthermore, the mask 20 is separated from the board b by air pressure caused by air blowing of the mask nozzles 42 and 44 while the mask 20 maintains the horizontal state, so that the solder paste can be easily withdrawn from the pattern holes to easily print the solder bumps 70.

Therefore, defects of the solder bumps 70 can be effectively prevented to increase printability and yield, which may increase the reliability of the board b.

As set forth above, according to exemplary embodiments of the present invention, the bump printing apparatus effectively prevents defects of solder bumps to increase printability and yield, thereby increasing the reliability of a board.

Furthermore, apparatus productivity is improved, and application and process management are facilitated because of a simplified configuration thereof.

While the present invention has been shown and described in connection with the exemplary embodiments, it will be apparent to those skilled in the art that modifications and variations can be made without departing from the spirit and scope of the present invention as defined by the appended claims.

What is claimed is:

1. A bump printing apparatus comprising:
   a printing table onto which a board is mounted;
   a mask making close contact with the board and printing solder bumps on the board by separating the mask from the board after a printing operation;
   mask tables extending from the printing table to edges of the mask and sucking the edges of the mask to bring the edges of the mask into close contact with the board under vacuum; and
   air nozzles provided within the printing table and the mask tables, providing air suction so that the board and the mask make close contact with the printing table and the mask tables, respectively, and spraying air so that the mask is separated from the board.

2. The bump printing apparatus of claim 1, wherein the mask tables extend towards outer surfaces of the printing table and are formed integrally with the printing table.

3. The bump printing apparatus of claim 1, wherein the mask tables are detachably provided on the outer surfaces of the printing table.

4. The bump printing apparatus of claim 1, wherein an upper surface of the mask table is located on the same horizontal plane as an upper surface of the board.

5. The bump printing apparatus of claim 1, wherein the mask tables face each other on the basis of the printing table and protrude to a height corresponding to a thickness of the board so that a step is formed between the printing table and each of the mask tables.

6. The bump printing apparatus of claim 1, wherein the air nozzles comprise:
   a plurality of board nozzles arranged along the upper surface of the printing table and providing air suction to bring the board into close contact with the printing table; and
   a plurality of mask nozzles arranged along upper surfaces of the mask tables, providing air suction to bring the mask into close contact with the board and the mask tables, and spraying air to separate the mask from the board.

7. The bump printing apparatus of claim 6, wherein the plurality of mask nozzles are arranged along the upper surfaces of the mask tables and the printing table.

8. The bump printing apparatus of claim 1, wherein the board has air holes formed therethrough so that air being sprayed through the air nozzles passes through the board and moves upward from the board.

9. The bump printing apparatus of claim 1, further comprising a control unit controlling the air nozzles.

* * * * *